United States Patent
Plihal et al.

(10) Patent No.: US 11,379,969 B2
(45) Date of Patent: Jul. 5, 2022

(54) METHOD FOR PROCESS MONITORING WITH OPTICAL INSPECTIONS

(71) Applicant: KLA CORPORATION, Milpitas, CA (US)

(72) Inventors: Martin Plihal, Pleasanton, CA (US); Prasanti Uppaluri, Saratoga, CA (US); Saravanan Paramasivam, Chennai (IN)

(73) Assignee: KLA CORPORATION, Milpitas, CA (US)

( * ) Notice: Subject to any disclaimer, the term of this patent is extended or adjusted under 35 U.S.C. 154(b) by 162 days.

(21) Appl. No.: 16/940,373

(22) Filed: Jul. 27, 2020

(65) Prior Publication Data
US 2021/0035282 A1 Feb. 4, 2021

Related U.S. Application Data

(60) Provisional application No. 62/902,224, filed on Sep. 18, 2019.

(30) Foreign Application Priority Data

Aug. 1, 2019 (IN) .............................. 201941031131

(51) Int. Cl.
*G06T 7/00* (2017.01)
*G06T 7/246* (2017.01)

(52) U.S. Cl.
CPC ............ *G06T 7/0004* (2013.01); *G06T 7/246* (2017.01); *G06T 2207/10061* (2013.01); *G06T 2207/20081* (2013.01); *G06T 2207/30148* (2013.01)

(58) Field of Classification Search
CPC . G06T 2207/10061; G06T 2207/20081; G06T 2207/30148; G06T 7/0004; G06T 7/246; G06V 2201/06
See application file for complete search history.

(56) References Cited

U.S. PATENT DOCUMENTS

| | | | |
|---|---|---|---|
| 2011/0050703 A1* | 3/2011 | Artan | G06T 7/11 345/440 |
| 2011/0164809 A1 | 7/2011 | Shibuya et al. | |
| 2012/0117010 A1 | 5/2012 | Ono et al. | |
| 2014/0198975 A1 | 7/2014 | Nakagaki et al. | |
| 2019/0302031 A1* | 10/2019 | Plihal | G05B 19/41875 |
| 2020/0202252 A1* | 6/2020 | Asbag | G06N 20/00 |

FOREIGN PATENT DOCUMENTS

| | | |
|---|---|---|
| KR | 1020150086302 A | 7/2015 |
| KR | 1020170042232 A | 4/2017 |

OTHER PUBLICATIONS

ISA/KR, ISR for PCT/US2020/044366, Nov. 11, 2020.
ISA/KR, WO for PCT/US2020/044366, Nov. 11, 2020.

\* cited by examiner

*Primary Examiner* — Bobbak Safaipour
(74) *Attorney, Agent, or Firm* — Hodgson Russ LLP

(57) ABSTRACT

Machine learning approaches provide additional information about semiconductor wafer inspection stability issues that makes it possible to distinguish consequential process variations like process excursions from minor process variations that are within specification. The effect of variable defect of interest (DOI) capture rates in the inspection result and the effect of variable defect count on the wafer can be monitored independently.

18 Claims, 5 Drawing Sheets

METHOD FOR PROCESS MONITORING WITH OPTICAL INSPECTIONS

CROSS-REFERENCE TO RELATED APPLICATIONS

This application claims priority to Indian App. No. 201941031131 filed Aug. 1, 2019 and U.S. App. No. 62/902,224 filed Sep. 18, 2019 and assigned, the disclosures of which are hereby incorporated by reference.

FIELD OF THE DISCLOSURE

This disclosure relates to inspection of semiconductor wafers.

BACKGROUND OF THE DISCLOSURE

Evolution of the semiconductor manufacturing industry is placing greater demands on yield management and, in particular, on metrology and inspection systems. Critical dimensions continue to shrink, yet the industry needs to decrease time for achieving high-yield, high-value production. Minimizing the total time from detecting a yield problem to fixing it determines the return-on-investment for a semiconductor manufacturer.

Fabricating semiconductor devices, such as logic and memory devices, typically includes processing a semiconductor wafer using a large number of fabrication processes to form various features and multiple levels of the semiconductor devices. For example, lithography is a semiconductor fabrication process that involves transferring a pattern from a reticle to a photoresist arranged on a semiconductor wafer. Additional examples of semiconductor fabrication processes include, but are not limited to, chemical-mechanical polishing (CMP), etch, deposition, and ion implantation. An arrangement of multiple semiconductor devices fabricated on a single semiconductor wafer may be separated into individual semiconductor devices.

Inspection processes are used at various steps during semiconductor manufacturing to detect defects on wafers to promote higher yield in the manufacturing process and, thus, higher profits. Inspection has always been an important part of fabricating semiconductor devices such as integrated circuits (ICs). However, as the dimensions of semiconductor devices decrease, inspection becomes even more important to the successful manufacture of acceptable semiconductor devices because smaller defects can cause the devices to fail. For instance, as the dimensions of semiconductor devices decrease, detection of defects of decreasing size has become necessary because even relatively small defects may cause unwanted aberrations in the semiconductor devices.

As design rules shrink, however, semiconductor manufacturing processes may be operating closer to the limitation on the performance capability of the processes. In addition, smaller defects can have an impact on the electrical parameters of the device as the design rules shrink, which drives more sensitive inspections. As design rules shrink, the population of potentially yield-relevant defects detected by inspection grows dramatically, and the population of nuisance defects detected by inspection also increases dramatically. Therefore, more defects may be detected on the wafers, and correcting the processes to eliminate all of the defects may be difficult and expensive. Determining which of the defects actually have an effect on the electrical parameters of the devices and the yield may allow process control methods to be focused on those defects while largely ignoring others. Furthermore, at smaller design rules, process-induced failures, in some cases, tend to be systematic. That is, process-induced failures tend to fail at predetermined design patterns often repeated many times within the design. Elimination of spatially-systematic, electrically-relevant defects can have an impact on yield.

Optical inspections are used to monitor the wafer manufacturing process by tracking the counts of defects and nuisance on wafers during manufacturing. Since optical inspections lack the resolution to determine defect types with certainty, defect monitoring relies on a separate scanning electron microscope (SEM) review. Due to limited SEM tool time budgets at a semiconductor manufacturing facility, the method is mostly statistical in nature. Small number of defects from the inspection are sampled, reviewed with an SEM, and classified. The SEM-established defect counts in the sample are then projected on the inspection counts to estimate the defect counts on the wafer.

Process monitoring is done by tracking the trends in defect counts over time through statistical process control (SPC) in high volume manufacturing (HVM) or using other less rigorous statistical methods. Previously, an optical inspection was performed. Sensitivity to defects of interest (DOIs) was optimized and nuisance was suppressed. Random sampling was performed, which was followed by SEM review and classification to classify the sampled defects. SPC was then performed to count normalization from the sample and to plot defect count trends.

One problem with the existing monitoring methodology is that optical inspections are themselves sensitive to process changes that they are intended to monitor. This is particularly limiting because optical properties of wafers are sensitive to even subtle changes in wafer processing that do not affect electrical properties of the chips (i.e., changes that are well within the process window specification). Because of this sensitivity, optical inspections exhibit variation in defect capture rate and nuisance rate even within the process window and measure undesirable effects. Process variations in film thickness, critical dimensions, line edge roughness, different material distribution during deposition, slight over-etching or under-etching, or other variables can change the optical properties of wafers. These process variations can, thus, affect an optical inspection result.

This inherent variability in optical inspections makes accurate monitoring difficult, and the problem is getting worse because higher nuisance rates and tighter inspection thresholds are necessary to achieve adequate DOI capture rate in smaller design rules. With the previous technique, it may be impossible to separate the effects of process variability in the inspection result. This limitation impacts the ability to effectively monitor the process.

Therefore, new methods and systems for semiconductor wafer inspection are needed.

BRIEF SUMMARY OF THE DISCLOSURE

A method is provided in a first embodiment. The method includes optically inspecting a plurality of wafers with an optical inspection tool thereby generating images. Features are extracted from the images with machine learning-based classifiers using a processor. Using the processor, monitoring metrics are determined from the features and a population of all detected events for the wafer. Classified defects of the wafers are received from a scanning electron microscope at the processor. Using the processor, separability metrics are determined for the classified defects in relation to inspection thresholds. The separability metrics account for a population distribution of the classified defects. Separability trends of the defects for the wafers are determined using the processor.

The optical inspection tool can be a broad band plasma inspection tool.

The method can further include filtering nuisance from the detected events for the wafer using the processor.

The method can further include determining confidence values for each of the detected events for the wafer using the processor. Using the processor, defect movement can be determined with respect to inspection thresholds. Determining defect movement can include projecting all the detected events on a confidence axis and monitoring motion of the classified defects along the confidence axis with respect to a threshold. Determining defect movement also can include classifying the defect movement from process changes that impact yield and process changes that affect inspection sensitivity.

The separability trends can monitor confidence that classified defects are captured. The separability trends can monitor signal strength and/or signal spread.

A non-transitory computer readable medium can store a program configured to instruct a processor to execute the method of the first embodiment.

A system is provided in a second embodiment. The system includes an optical inspection tool and a processor. The optical inspection tool includes a light source, a stage configured to hold a wafer, and a detector. The processor is in electronic communication with the detector. The processor is configured to: generate images of a plurality of the wafers using data from the detector; extract features from the images with machine learning-based classifiers; determine monitoring metrics from the features and a population of all detected events for the wafer; receive classified defects of the wafers from a scanning electron microscope; determine separability metrics for the classified defects in relation to inspection thresholds; and determine separability trends of the defects for the wafers. The separability metrics account for a population distribution of the classified defects.

The light source can be a broad band plasma source.

The processor can be further configured to filter nuisance from the detected events for the wafer. The processor can be further configured to determine confidence values for each of the detected events for the wafer. The processor can be further configured to determine defect movement with respect to inspection thresholds. Determining the defect movement can include projecting all the detected events on a confidence axis and monitoring motion of the classified defects along the confidence axis with respect to a threshold. Determining the defect movement also can includes classifying the defect movement from process changes that impact yield and process changes that affect inspection sensitivity.

DESCRIPTION OF THE DRAWINGS

For a fuller understanding of the nature and objects of the disclosure, reference should be made to the following detailed description taken in conjunction with the accompanying drawings, in which.

DETAILED DESCRIPTION OF THE DISCLOSURE

Although claimed subject matter will be described in terms of certain embodiments, other embodiments, including embodiments that do not provide all of the benefits and features set forth herein, are also within the scope of this disclosure. Various structural, logical, process step, and electronic changes may be made without departing from the scope of the disclosure. Accordingly, the scope of the disclosure is defined only by reference to the appended claims.

Embodiments disclosed herein provide process monitoring with BBP or other optical inspections of semiconductor wafers. Machine learning approaches are used to provide additional information about inspection stability issues, which makes it possible to distinguish consequential process variations like process excursions from minor process variations that are within specification. The effect of variable DOI capture rates in the inspection result can be monitored independently of the effect of variable defect count on the wafer.

Classification confidence can be used for process monitoring and recipe stability measurements. The classification confidence can be determined by machine learning (ML) algorithms. Classification confidence of the SEM-reviewed defects can be used with a known ground truth to produce metrics that describe signal strength and signal spread per defect type. Recordings of the wafer-to-wafer trends in these new class-based metrics can be monitored and/or recorded over time and for process and inspection variability monitoring.

Figure 1:
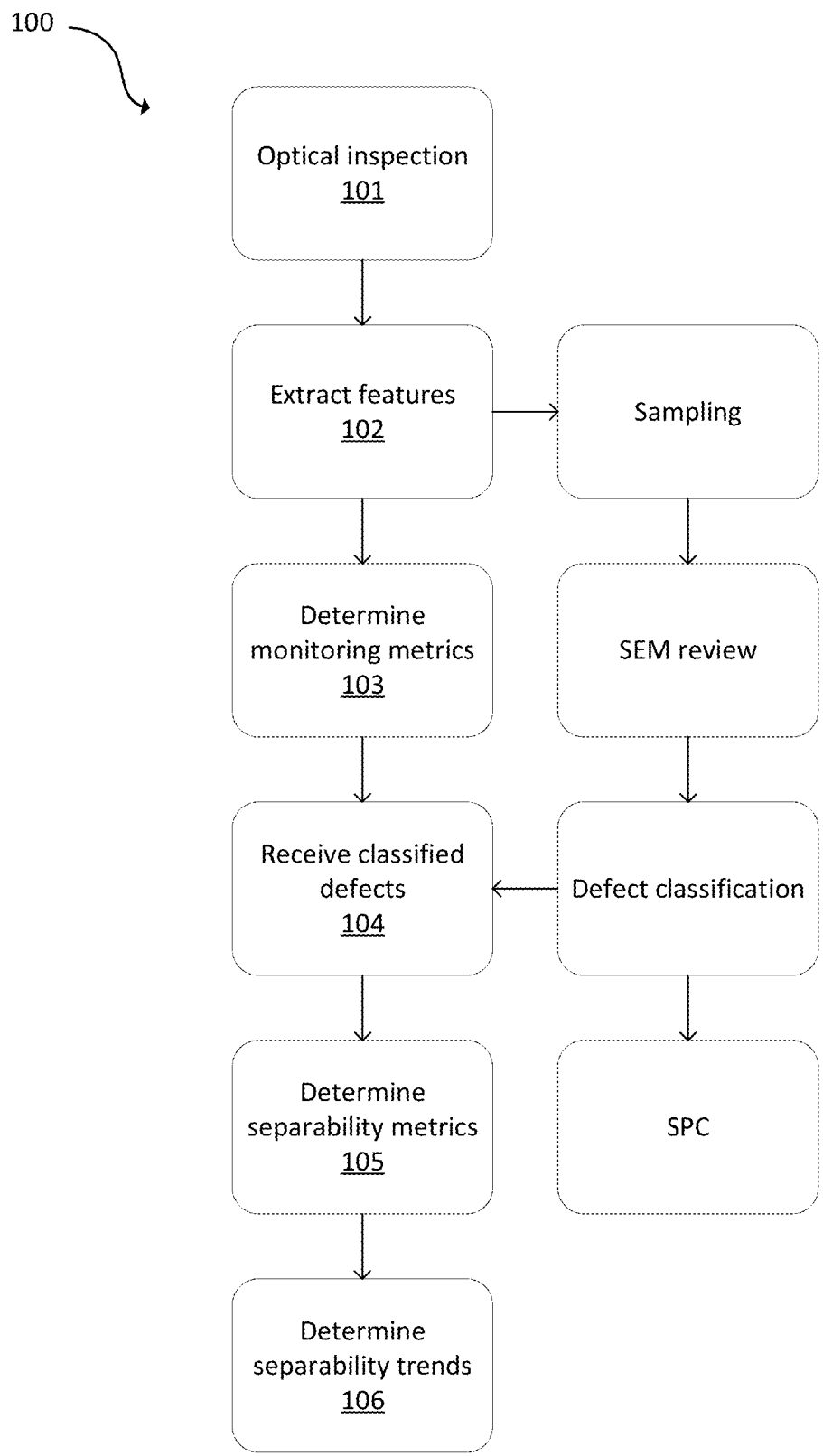
FIG. 1 is a flowchart of an embodiment of a method in accordance with the present disclosure.

FIG. 1 is a flowchart of an embodiment of a method 100. At least steps 102-106 can be performed using a processor, but other steps of the method 100 may be performed using the same or a different processor. The method 100 uses optical inspection and then samples the optical inspection results, uses a SEM review of the samples, and uses classification of the SEM images. The classification can include auto-labeling the classification onto the inspection results, estimating defect counts in the inspection, and generating SPC charts with excursion alerts.

A machine learning algorithm can be used for nuisance filtering and binning. Machine learning algorithms also can be used with optical inspection tools to generate classification results and confidence values. Class-based confidence values on defects can be used to measure defect movement with respect to the inspection thresholds (e.g., nuisance event filter (NEF) and binner cut lines). All defects can be projected on the confidence axis and the motion of the known (classified) defects along this axis can be monitored with respect to the threshold.

One or more semiconductor wafers are optically inspected at 101. This can use an optical inspection tool, such as a BBP inspection tool. A machine learning-based algorithm can be used to filter nuisance and to optimize sensitivity to DOIs in the images from the inspection from step 101.

The machine learning-based algorithm can generate classification probability. For example, the machine learning-based algorithm could be a neural network, a support vector machine, a boosted trees/forests, random forest, nearest neighbor, or other machine learning-based algorithms.

Features are extracted at 102 from the images from step 101. The features, which can be separability attributes, can be generated using machine learning-based classifiers (e.g., nuisance filters). The features are used by the machine learning algorithm to produce classification results, which can be extracted from optical images of the defect location. Thus, extracting features may include applying a classifier. Separability can be learned during the classifier training. Machine learning can be encoded in class-based confidences.

At 103, monitoring metrics can be determined from the features and a population of all detected events for the wafer. The monitoring metrics can be unsupervised. Statistical measurements derived from the separability. Monitoring metrics can be determined by the nuisance filter (e.g., the machine learning classifier). The nuisance filter calculates classification confidence. This confidence of the DOIs is monitored between wafers looking for conditions when the confidence drops, which is an indication that the recipe loses sensitivity to the DOIs.

In an instance, a nuisance filter can determine apply a class code to each defect from the optical inspection. The class code can have a value attached from 0 to 1. For example, everything greater than 0.5 can be classified as a DOI. The 0.5 threshold can be adjusted based on the particular application, the optical inspection tool, or the device being inspected. The difference between the value for the class code and the threshold can determine the confidence. A larger difference means greater confidence.

After 103, defects above the threshold may be classified.

Classified defects of each of the wafers are received from a scanning electron microscope at 104. Sampling of the classified defects may be random, which means it is unbiased. Unbiased information can make the later trends that are identified more meaningful. The classified defects are from the same wafer as with the optical inspection and can provide a ground truth. Each wafer that is optically inspected can have a random sample of detected defects reviewed and classified. Confidence of DOIs that are verified by SEM can be monitored.

At 105, separability metrics for the classified defects in relation to inspection thresholds are determined. The separability metric for individual DOIs can be the confidence calculated by the nuisance filter. The overall metric can be an average confidence for all DOIs on the wafers that were verified using the SEM. The inspection thresholds may be fixed. The separability metrics can account for a population distribution of the classified defects. Thus, the separability metrics can be population-normalized. The metrics for the classified defects can be per defect type.

Step 105 can include labeling (e.g., auto-labeling) the group truth to generate supervised monitoring metrics.

Separability trends of the defects for the wafers are determined at 106. This can be part of an enhanced SPC. The separability trends can be plotted over time for each wafer. Average classification confidence can be recorded with respect to the classification boundary for each wafer. Trends can be monitored.

In an instance, the average classification confidence of DOIs from the SEM inspection can be determined, such as using the classifier/nuisance filter. These values can be determined for all wafers for the same device/layer. The trend of the average confidence can be monitored over time. Nuisance can be filtered from the detected events for the wafer. Confidence values can be determined for each of the detected events for the wafer.

Defect movement with respect to inspection thresholds can be determined over time. This can include projecting all the detected events on a confidence axis and monitoring motion of the classified defects along the confidence axis with respect to a threshold.

Determining the defect movement also can include classifying or otherwise identifying process changes that impact yield and determining process changes that affect inspection sensitivity and/or DOI-nuisance separability.

Separate from the embodiments disclosed herein, the method also can optionally perform SPC. A semiconductor manufacturer can perform other steps with SPC.

Statistics for each defect type can be determined for each wafer. These statistics can include the average signal strength (e.g., confidence) for the defect type and the signal spread (standard deviation), which is shown in FIG. 2.

Figure 2:
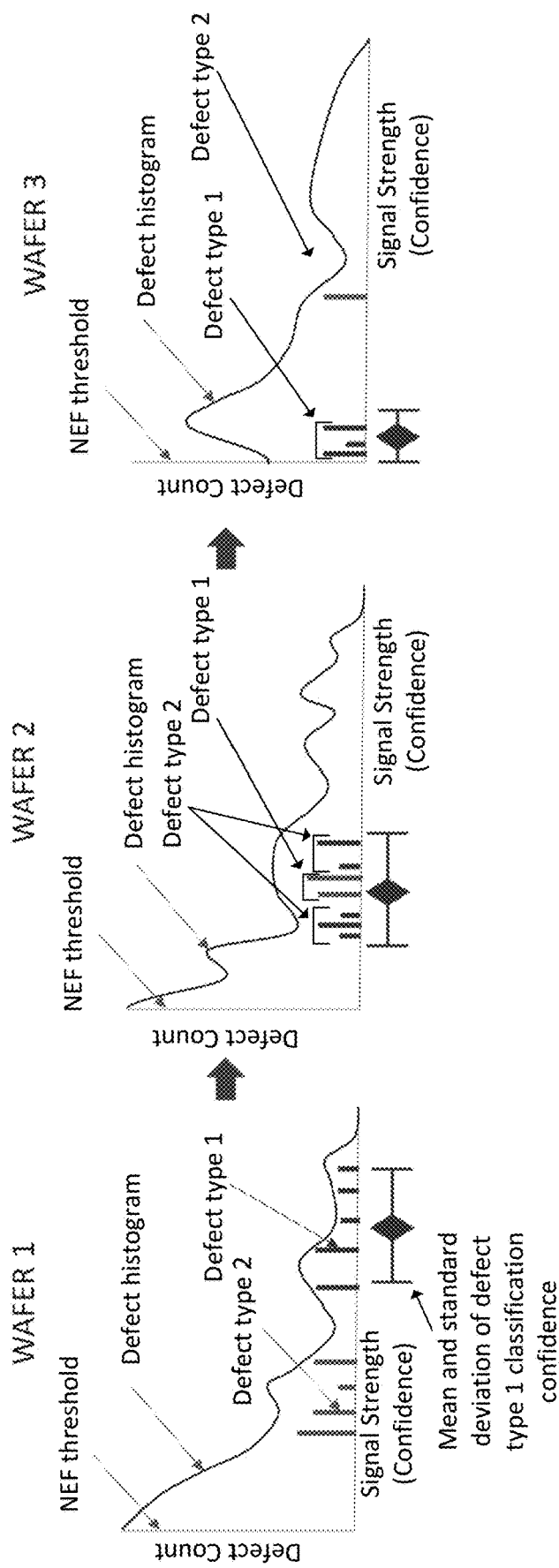
FIG. 2 includes charts illustrating metrics for process monitoring with broad band plasma (BBP) optical inspection.

FIG. 2 includes charts illustrating metrics for process monitoring with BBP optical inspection. Defect type 1 and defect type 2 are different types of defects. While three wafers are illustrated, more wafers can be included in the analysis. The curve shows the histogram of all defects in the inspection as a function of the confidence for each defect. Thus, all defects above the threshold can be plotted on the histogram. Defects on the histogram farther from the left have higher confidence, which means that it is more likely the defect is a DOI. For example, the confidence of defect type 1 is higher in wafer 1 than the confidence of defect type 2.

The bars under the curve show the positions of the sampled defect with known ground truth. These are defects from the SEM review.

The signal strength can include the mean and standard deviation of defect type 1 confidence. The signal strength can be monitored for each wafer.

The trends of these collective metrics can be monitored over time like how defect counts are tracked in SPC. The trends can be used to derive information about changes in defect-nuisance separability and DOI cap rate of the optical inspection.

Figure 3:
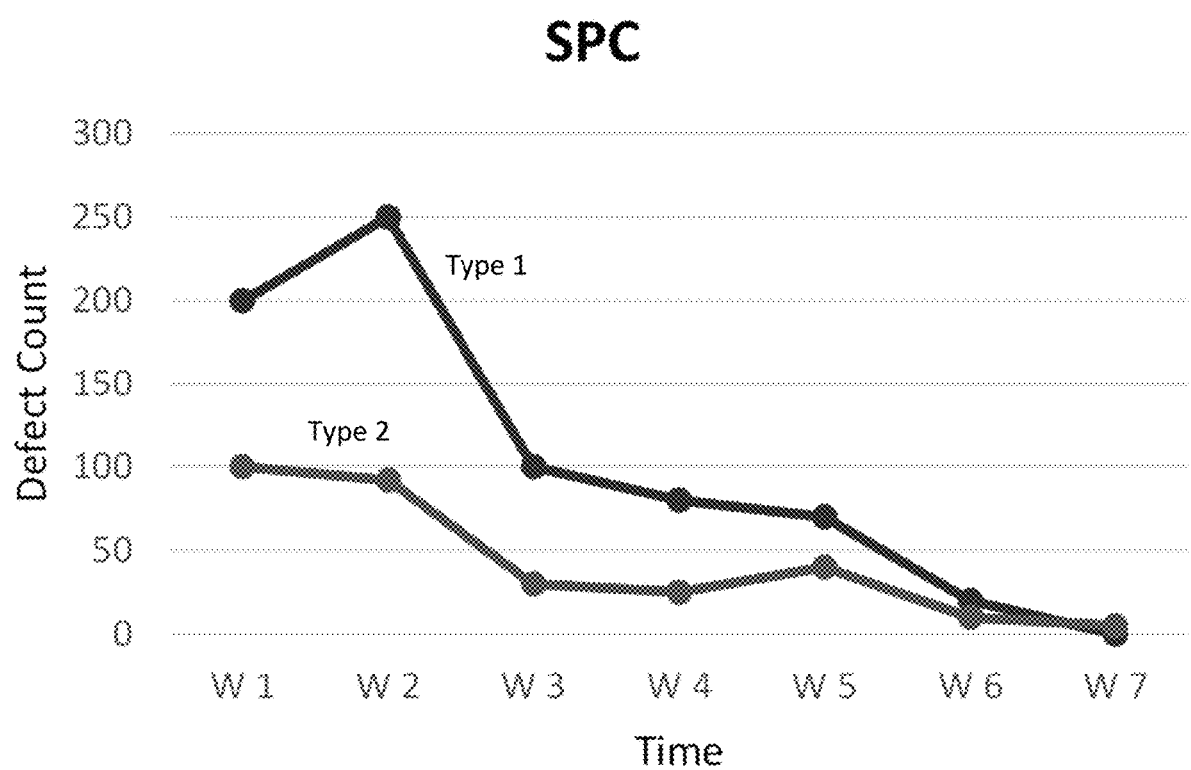
FIG. 3 is a chart showing SPC using the embodiments disclosed herein.
Figure 4:
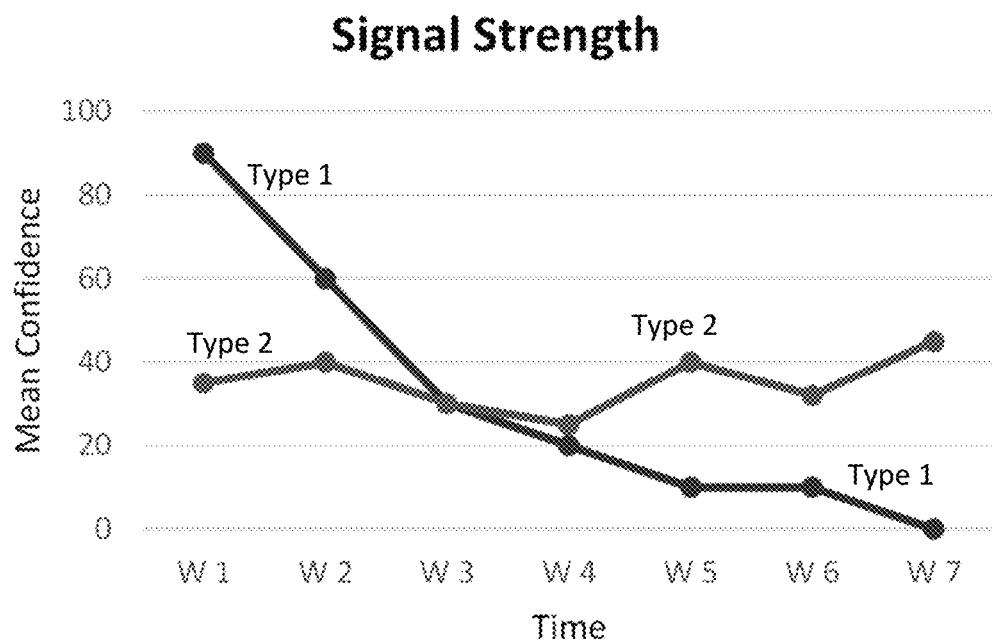
FIG. 4 is a chart showing signal strength using the embodiments disclosed herein.
Figure 5:
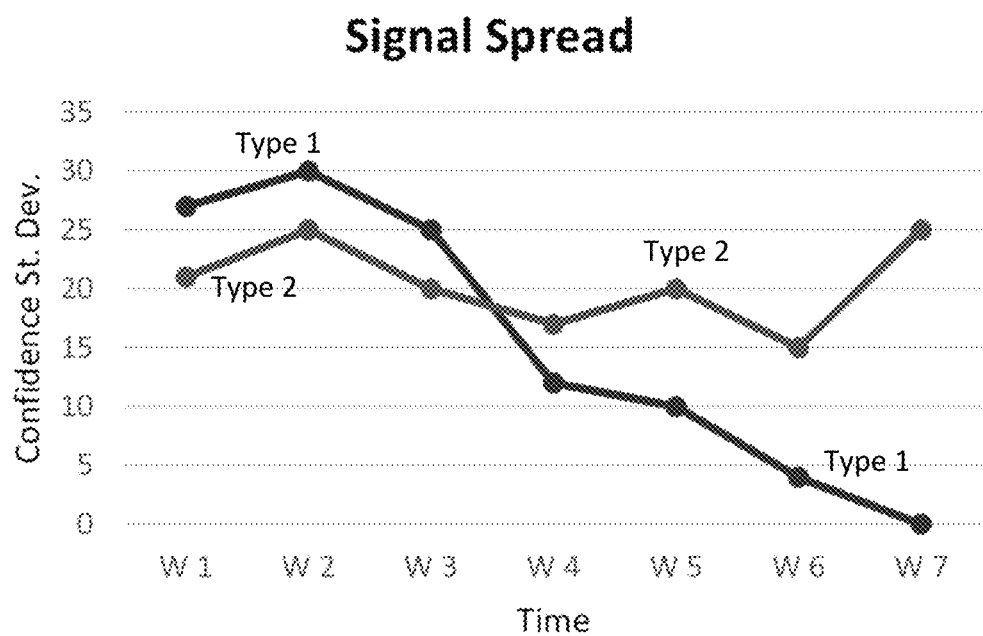
FIG. 5 is a chart showing signal spread using the embodiments disclosed herein.

FIG. 3 is a chart showing SPC. FIG. 4 is a chart showing signal strength. FIG. 5 is a chart showing signal spread. The charts of FIGS. 3 and 4 are from multiple wafers (W1 through W7). Confidence for each defect type can be determined and changes can be monitored over time. Over time, an inspection tool may drift and lose signal. Defects may have a confidence closer to the threshold due to this drift. This means that some defects may be missed during inspection. Using the capture rate over time can identify trends and improve inspection.

For SPC in FIG. 3, the counts of both defect type 1 and defect type 2 go down with time. However, the signal strength shows that signal strength of defect type 1 decreases with time while signal strength of defect type 2 stays approximately constant in FIG. 4. The signal spread in FIG. 5 shows that the signal spread of defect type 1 falls at some point while the signal spread of defect type 2 stays approximately constant. Thus, the new tracking information indicates that the defect count of defect type 2 decreases with time while the defect count of defect type 1 decreases because of lost sensitivity to defect type 1 in the optical inspection. Defect type 2 has the same confidence as a function of time, so reduced count in the inspection is an indication of reduced count on the wafer. The confidence that defect type 2 capture rate is generally steady. The reduced count of type 1 may be caused by the inspection losing sensitivity and not capturing the same fraction of defects that are on the wafer. Defect type 1 instances are captured with less confidence over time, which means that defect count may not be representative of the number of defect type 1 on the wafer. The inspection may be less sensitive to defect type 1, which means the inspection tool should be tuned.

Tracking inspection variability with respect to defect capture rates and nuisance rates along with the statistics of defect counts in the inspection provides comprehensive approach to process control and inspection variability monitoring. Process changes that impact yield can be separated from those that only affect inspection sensitivity and/or DOI-nuisance separability.

In an instance, the optical inspection tool produces the new process-related defect-level attributes. These attributes are then processed by a compute engine directly integrated into the database that calculates the process-monitoring metrics. The database also contains the monitoring software and user interface for displaying trends. In this implementation, additional monitoring capabilities may be integrated for monitoring tool/recipe performance.

In another instance, the newly-created process-related attributes are exported into a data file for semiconductor manufacturing, such as KLARF. These are then made available to develop customized monitoring strategies built into yield management software (YMS) and other internal monitoring solutions for a semiconductor manufacturing facility.

While BBP optical inspections are specifically disclosed, embodiments disclosed herein can be used with other optical inspections that rely on SEM for verification.

Figure 6:
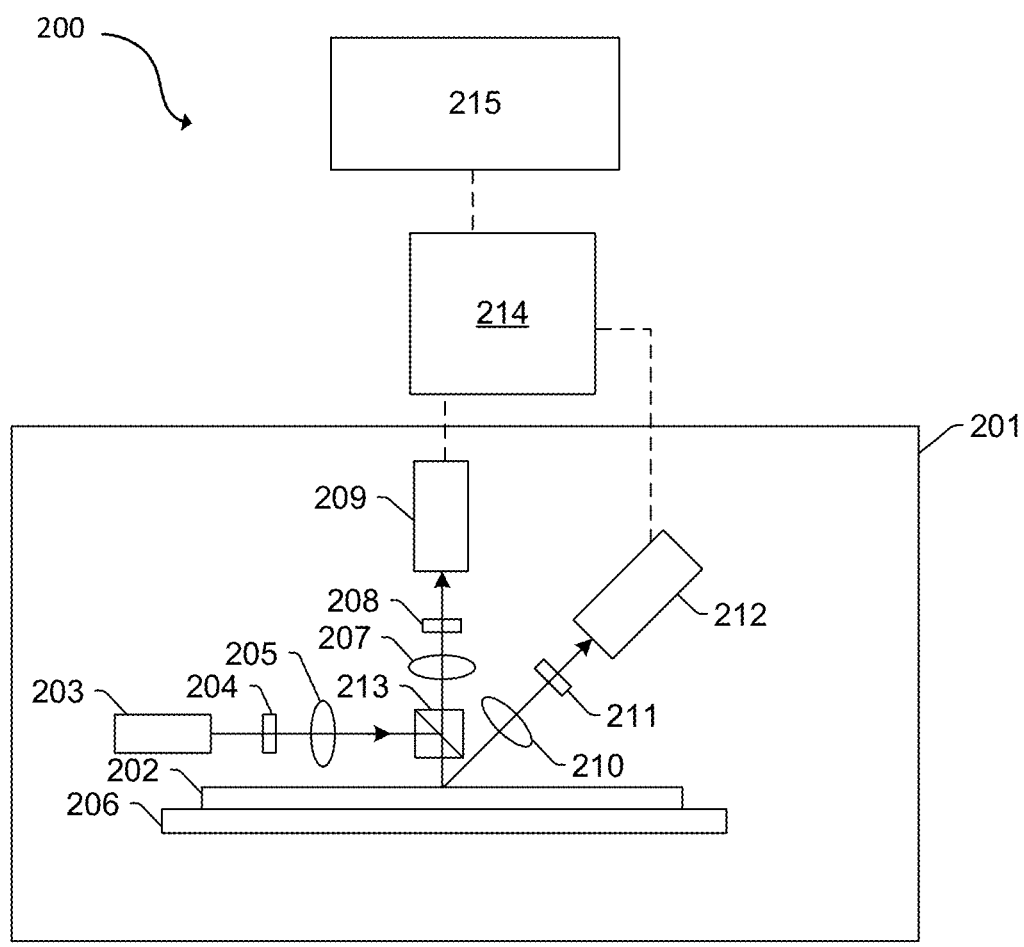
FIG. 6 is a diagram of an embodiment of a system in accordance with the present disclosure.

One embodiment of a system 200 with an optical inspection tool is shown in FIG. 6. The system 200 includes optical based subsystem 201. In general, the optical based subsystem 201 is configured for generating optical based output for a specimen 202 by directing light to (or scanning light over) and detecting light from the specimen 202. In one embodiment, the specimen 202 includes a wafer. The wafer may include any wafer known in the art. In another embodiment, the specimen 202 includes a reticle. The reticle may include any reticle known in the art.

In the embodiment of the system 200 shown in FIG. 6, optical-based subsystem 201 includes an illumination subsystem configured to direct light to specimen 202. The illumination subsystem includes at least one light source. For example, as shown in FIG. 6, the illumination subsystem includes light source 203. In one embodiment, the illumination subsystem is configured to direct the light to the specimen 202 at one or more angles of incidence, which may include one or more oblique angles and/or one or more normal angles. For example, as shown in FIG. 6, light from light source 203 is directed through optical element 204 and then lens 205 to specimen 202 at an oblique angle of incidence. The oblique angle of incidence may include any suitable oblique angle of incidence, which may vary depending on, for instance, characteristics of the specimen 202.

The optical-based subsystem 201 may be configured to direct the light to the specimen 202 at different angles of incidence at different times. For example, the optical-based subsystem 201 may be configured to alter one or more characteristics of one or more elements of the illumination subsystem such that the light can be directed to the specimen at an angle of incidence that is different than that shown in FIG. 6. In one such example, the optical-based subsystem 201 may be configured to move light source 203, optical element 204, and lens 205 such that the light is directed to the specimen 202 at a different oblique angle of incidence or a normal (or near normal) angle of incidence.

In some instances, the optical-based subsystem 201 may be configured to direct light to the specimen 202 at more than one angle of incidence at the same time. For example, the illumination subsystem may include more than one illumination channel, one of the illumination channels may include light source 203, optical element 204, and lens 205 as shown in FIG. 6 and another of the illumination channels (not shown) may include similar elements, which may be configured differently or the same, or may include at least a light source and possibly one or more other components such as those described further herein. If such light is directed to the specimen at the same time as the other light, one or more characteristics (e.g., wavelength, polarization, etc.) of the light directed to the specimen 202 at different angles of incidence may be different such that light resulting from illumination of the specimen 202 at the different angles of incidence can be discriminated from each other at the detector(s).

In another instance, the illumination subsystem may include only one light source (e.g., light source 203 shown in FIG. 6) and light from the light source may be separated into different optical paths (e.g., based on wavelength, polarization, etc.) by one or more optical elements (not shown) of the illumination subsystem. Light in each of the different optical paths may then be directed to the specimen 202. Multiple illumination channels may be configured to direct light to the specimen 202 at the same time or at different times (e.g., when different illumination channels are used to sequentially illuminate the specimen). In another instance, the same illumination channel may be configured to direct light to the specimen 202 with different characteristics at different times. For example, in some instances, optical element 204 may be configured as a spectral filter and the properties of the spectral filter can be changed in a variety of different ways (e.g., by swapping out the spectral filter) such that different wavelengths of light can be directed to the specimen 202 at different times. The illumination subsystem may have any other suitable configuration known in the art for directing the light having different or the same characteristics to the specimen 202 at different or the same angles of incidence sequentially or simultaneously.

In one embodiment, light source 203 may include a BBP source. In this manner, the light generated by the light source 203 and directed to the specimen 202 may include broadband light. However, the light source may include any other suitable light source such as a laser. The laser may include any suitable laser known in the art and may be configured to generate light at any suitable wavelength or wavelengths known in the art. In addition, the laser may be configured to generate light that is monochromatic or nearly-monochromatic. In this manner, the laser may be a narrowband laser. The light source 203 may also include a polychromatic light source that generates light at multiple discrete wavelengths or wavebands.

Light from optical element 204 may be focused onto specimen 202 by lens 205. Although lens 205 is shown in FIG. 6 as a single refractive optical element, it is to be understood that, in practice, lens 205 may include a number of refractive and/or reflective optical elements that in combination focus the light from the optical element to the specimen. The illumination subsystem shown in FIG. 6 and described herein may include any other suitable optical elements (not shown). Examples of such optical elements include, but are not limited to, polarizing component(s), spectral filter(s), spatial filter(s), reflective optical element(s), apodizer(s), beam splitter(s) (such as beam splitter 213), aperture(s), and the like, which may include any such suitable optical elements known in the art. In addition, the optical-based subsystem 201 may be configured to alter one or more of the elements of the illumination subsystem based on the type of illumination to be used for generating the optical based output.

The optical-based subsystem 201 may also include a scanning subsystem configured to cause the light to be scanned over the specimen 202. For example, the optical-based subsystem 201 may include stage 206 on which specimen 202 is disposed during optical based output generation. The scanning subsystem may include any suitable mechanical and/or robotic assembly (that includes stage 206) that can be configured to move the specimen 202 such that the light can be scanned over the specimen 202. In addition, or alternatively, the optical-based subsystem 201 may be configured such that one or more optical elements of the optical-based subsystem 201 perform some scanning of the light over the specimen 202. The light may be scanned over the specimen 202 in any suitable fashion such as in a serpentine-like path or in a spiral path.

The optical-based subsystem 201 further includes one or more detection channels. At least one of the one or more detection channels includes a detector configured to detect light from the specimen 202 due to illumination of the specimen 202 by the subsystem and to generate output responsive to the detected light. For example, the optical-based subsystem 201 shown in FIG. 6 includes two detection channels, one formed by collector 207, element 208, and detector 209 and another formed by collector 210, element 211, and detector 212. As shown in FIG. 6, the two detection channels are configured to collect and detect light at different angles of collection. In some instances, both detection channels are configured to detect scattered light, and the detection channels are configured to detect tight that is scattered at different angles from the specimen 202. However, one or more of the detection channels may be configured to detect another type of light from the specimen 202 (e.g., reflected light).

As further shown in FIG. 6, both detection channels are shown positioned in the plane of the paper and the illumination subsystem is also shown positioned in the plane of the paper. Therefore, in this embodiment, both detection channels are positioned in (e.g., centered in) the plane of incidence. However, one or more of the detection channels may be positioned out of the plane of incidence. For example, the detection channel formed by collector 210, element 211, and detector 212 may be configured to collect and detect light that is scattered out of the plane of incidence. Therefore, such a detection channel may be commonly referred to as a "side" channel, and such a side channel may be centered in a plane that is substantially perpendicular to the plane of incidence.

Although FIG. 6 shows an embodiment of the optical-based subsystem 201 that includes two detection channels, the optical-based subsystem 201 may include a different number of detection channels (e.g., only one detection channel or two or more detection channels). In one such instance, the detection channel formed by collector 210, element 211, and detector 212 may form one side channel as described above, and the optical-based subsystem 201 may include an additional detection channel (not shown) formed as another side channel that is positioned on the opposite side of the plane of incidence. Therefore, the optical-based subsystem 201 may include the detection channel that includes collector 207, element 208, and detector 209 and that is centered in the plane of incidence and configured to collect and detect light at scattering angle(s) that are at or close to normal to the specimen 202 surface. This detection channel may therefore be commonly referred to as a "top" channel, and the optical-based subsystem 201 may also include two or more side channels configured as described above. As such, the optical-based subsystem 201 may include at least three channels (i.e., one top channel and two side channels), and each of the at least three channels has its own collector, each of which is configured to collect light at different scattering angles than each of the other collectors.

As described further above, each of the detection channels included in the optical-based subsystem 201 may be configured to detect scattered light. Therefore, the optical-based subsystem 201 shown in FIG. 6 may be configured for dark field (DF) output generation for specimens 202. However, the optical-based subsystem 201 may also or alternatively include detection channel(s) that are configured for bright field (BF) output generation for specimens 202. In other words, the optical-based subsystem 201 may include at least one detection channel that is configured to detect light specularly reflected from the specimen 202. Therefore, the optical-based subsystems 201 described herein may be configured for only DF, only BF, or both DF and BF imaging. Although each of the collectors are shown in FIG. 6 as single refractive optical elements, it is to be understood that each of the collectors may include one or more refractive optical die(s) and/or one or more reflective optical element(s).

The one or more detection channels may include any suitable detectors known in the art. For example, the detectors may include photo-multiplier tubes (PMTs), charge coupled devices (CCDs), time delay integration (TDI) cameras, and any other suitable detectors known in the art. The detectors may also include non-imaging detectors or imaging detectors. In this manner, if the detectors are non-imaging detectors, each of the detectors may be configured to detect certain characteristics of the scattered light such as intensity but may not be configured to detect such characteristics as a function of position within the imaging plane. As such, the output that is generated by each of the detectors included in each of the detection channels of the optical based subsystem may be signals or data, but not image signals or image data. In such instances, a processor such as processor 214 may be configured to generate images of the specimen 202 from the non-imaging output of the detectors. However, in other instances, the detectors may be configured as imaging detectors that are configured to generate imaging signals or image data. Therefore, the optical based subsystem may be configured to generate optical images or other optical based output described herein in a number of ways.

It is noted that FIG. 6 is provided herein to generally illustrate a configuration of an optical-based subsystem 201 that may be included in the system embodiments described herein or that may generate optical based output that is used by the system embodiments described herein. The optical-based subsystem 201 configuration described herein may be altered to optimize the performance of the optical-based subsystem 201 as is normally performed when designing a commercial output acquisition system. In addition, the systems described herein may be implemented using an existing system (e.g., by adding functionality described herein to an existing system). For some such systems, the methods described herein may be provided as optional functionality of the system (e.g., in addition to other functionality of the system). Alternatively, the system described herein may be designed as a completely new system.

The processor 214 may be coupled to the components of the system 200 in any suitable manner (e.g., via one or more transmission media, which may include wired and/or wireless transmission media) such that the processor 214 can receive output. The processor 214 may be configured to perform a number of functions using the output. The system 200 can receive instructions or other information from the processor 214. The processor 214 and/or the electronic data storage unit 215 optionally may be in electronic communication with a wafer inspection tool, a wafer metrology tool, or a wafer review tool (not illustrated) to receive additional information or send instructions. For example, the processor 214 and/or the electronic data storage unit 215 can be in electronic communication with an SEM.

The processor 214, other system(s), or other subsystem(s) described herein may be part of various systems, including a personal computer system, image computer, mainframe computer system, workstation, network appliance, internet appliance, or other device. The subsystem(s) or system(s) may also include any suitable processor known in the art, such as a parallel processor. In addition, the subsystem(s) or system(s) may include a platform with high-speed processing and software, either as a standalone or a networked tool. The processor 214 can be CPU or GPU.

The processor 214 and electronic data storage unit 215 may be disposed in or otherwise part of the system 200 or another device. In an example, the processor 214 and electronic data storage unit 215 may be part of a standalone control unit or in a centralized quality control unit. Multiple processors 214 or electronic data storage units 215 may be used.

The processor 214 may be implemented in practice by any combination of hardware, software, and firmware. Also, its functions as described herein may be performed by one unit, or divided up among different components, each of which may be implemented in turn by any combination of hardware, software and firmware. Program code or instructions for the processor 214 to implement various methods and functions may be stored in readable storage media, such as a memory in the electronic data storage unit 215 or other memory.

If the system 200 includes more than one processor 214, then the different subsystems may be coupled to each other such that images, data, information, instructions, etc. can be sent between the subsystems. For example, one subsystem may be coupled to additional subsystem(s) by any suitable transmission media, which may include any suitable wired and/or wireless transmission media known in the art. Two or more of such subsystems may also be effectively coupled by a shared computer-readable storage medium (not shown).

The processor 214 may be configured to perform a number of functions using the output of the system 200 or other output. For instance, the processor 214 may be configured to send the output to an electronic data storage unit 215 or another storage medium. The processor 214 may be further configured as described herein.

The processor 214 may be configured according to any of the embodiments described herein. The processor 214 also may be configured to perform other functions or additional steps using the output of the system 200 or using images or data from other sources.

Various steps, functions, and/or operations of system 200 and the methods disclosed herein are carried out by one or more of the following: electronic circuits, logic gates, multiplexers, programmable logic devices, ASICs, analog or digital controls/switches, microcontrollers, or computing systems. Program instructions implementing methods such as those described herein may be transmitted over or stored on carrier medium. The carrier medium may include a storage medium such as a read-only memory, a random access memory, a magnetic or optical disk, a non-volatile memory, a solid state memory, a magnetic tape, and the like. A carrier medium may include a transmission medium such as a wire, cable, or wireless transmission link. For instance, the various steps described throughout the present disclosure may be carried out by a single processor 214 or, alternatively, multiple processors 214. Moreover, different subsystems of the system 200 may include one or more computing or logic systems. Therefore, the above description should not be interpreted as a limitation on the present disclosure but merely an illustration.

In an instance, the processor 214 is in communication with the system 200. The processor 214 is configured to generate one or more images of at least one wafer from data from the detector; extract features from the images with machine learning-based classifiers; determine monitoring metrics from the features and a population of all detected events for the wafer; and receive classified defects of the wafer from a scanning electron microscope. Separability metrics for the classified defects are determined in relation to inspection thresholds, which may be fixed. The separability metrics account for a population distribution of the classified defects. Some or all of these steps can be repeated for two or more wafers. Separability trends can be determined.

The processor 214 can be further configured to filter nuisance from the detected events for the wafer using the processor and/or determine confidence values for each of the detected events for the wafer using the processor. The processor 214 also can be further configured to determine defect movement with respect to inspection thresholds. Determining the defect movement can include projecting all the detected events on a confidence axis and monitoring motion of the classified defects along the confidence axis with respect to a threshold. Determining the defect movement also can include determining process changes that impact yield and determining process changes that affect inspection sensitivity. The system 200 can be tuned based on the results, such as by adjusting the wavelength or by replacing the light source 203, optical element 204, lens 205, or other components.

An additional embodiment relates to a non-transitory computer-readable medium storing program instructions executable on a controller for performing a computer-implemented method for defect inspection, as disclosed herein. In particular, as shown in FIG. 6, electronic data storage unit 215 or other storage medium may contain non-transitory computer-readable medium that includes program instructions executable on the processor 214. The computer-implemented method may include any step(s) of any method(s) described herein, including method 100.

The program instructions may be implemented in any of various ways, including procedure-based techniques, component-based techniques, and/or object-oriented techniques, among others. For example, the program instructions may be implemented using ActiveX controls, C++ objects, JavaBeans, Microsoft Foundation Classes (MFC), Streaming SIMD Extension (SSE), or other technologies or methodologies, as desired.

Each of the steps of the method may be performed as described herein. The methods also may include any other step(s) that can be performed by the processor and/or computer subsystem(s) or system(s) described herein. The steps can be performed by one or more computer systems, which may be configured according to any of the embodiments described herein. In addition, the methods described above may be performed by any of the system embodiments described herein.

Although the present disclosure has been described with respect to one or more particular embodiments, it will be understood that other embodiments of the present disclosure may be made without departing from the scope of the present disclosure. Hence, the present disclosure is deemed limited only by the appended claims and the reasonable interpretation thereof.

What is claimed is:

1. A method comprising:
   optically inspecting a plurality of wafers with an optical inspection tool thereby generating images;
   extracting features from the images with machine learning-based classifiers using a processor;
   determining, using the processor, monitoring metrics from the features and a population of all detected events for the wafer;
   receiving, at the processor, classified defects of the wafers from a scanning electron microscope;
   determining, using the processor, separability metrics for the classified defects in relation to inspection thresholds, wherein the separability metrics account for a population distribution of the classified defects; and
   determining, using the processor, separability trends of the defects for the wafers.

2. The method of claim 1, wherein the optical inspection tool is a broad band plasma inspection tool.

3. The method of claim 1, further comprising filtering nuisance from the detected events for the wafer using the processor.

4. The method of claim 3, further comprising determining confidence values for each of the detected events for the wafer using the processor.

5. The method of claim 4, further comprising determining, using the processor, defect movement with respect to inspection thresholds.

6. The method of claim 5, wherein determining the defect movement includes:
   projecting all the detected events on a confidence axis; and
   monitoring motion of the classified defects along the confidence axis with respect to a threshold.

7. The method of claim 5, wherein determining the defect movement includes classifying the defect movement from process changes that impact yield and process changes that affect inspection sensitivity.

8. The method of claim 1, wherein the separability trends monitor confidence that classified defects are captured.

9. The method of claim 8, wherein the separability trends monitor signal strength.

10. The method of claim 8, wherein the separability trends monitor signal spread.

11. A non-transitory computer readable medium storing a program configured to instruct a processor to execute the method of claim 1.

12. A system comprising:
    an optical inspection tool including:
       a light source
       a stage configured to hold a wafer; and
       a detector; and
    a processor in electronic communication with the detector, wherein the processor is configured to:
       generate images of a plurality of the wafers using data from the detector;
       extract features from the images with machine learning-based classifiers using a processor;
       determine monitoring metrics from the features and a population of all detected events for the wafer;
       receive classified defects of the wafers from a scanning electron microscope;
       determine separability metrics for the classified defects in relation to inspection thresholds, wherein the separability metrics account for a population distribution of the classified defects; and
       determine separability trends of the defects for the wafers.

13. The system of claim 12, wherein the light source is a broad band plasma source.

14. The system of claim 12, wherein the processor is further configured to filter nuisance from the detected events for the wafer.

15. The system of claim 14, wherein the processor is further configured to determine confidence values for each of the detected events for the wafer.

16. The system of claim 15, wherein the processor is further configured to determine defect movement with respect to inspection thresholds.

17. The system of claim 16, wherein determining the defect movement includes:
    projecting all the detected events on a confidence axis; and
    monitoring motion of the classified defects along the confidence axis with respect to a threshold.

18. The system of claim 16, wherein determining the defect movement includes classifying the defect movement from process changes that impact yield and process changes that affect inspection sensitivity.

* * * * *